(12) United States Patent
Chiba et al.

(10) Patent No.: US 11,850,573 B2
(45) Date of Patent: Dec. 26, 2023

(54) EXHAUST GAS CLEANING CATALYTIC DEVICE

(71) Applicant: CATALER CORPORATION, Kakegawa (JP)

(72) Inventors: Tomohiro Chiba, Kakegawa (JP); Kyosuke Murakami, Kakegawa (JP); Kenichi Taki, Kakegawa (JP); Shunsuke Haga, Kakegawa (JP)

(73) Assignee: CATALER CORPORATION, Kakegawa (JP)

( * ) Notice: Subject to any disclaimer, the term of this patent is extended or adjusted under 35 U.S.C. 154(b) by 190 days.

(21) Appl. No.: 17/435,840

(22) PCT Filed: Mar. 23, 2020

(86) PCT No.: PCT/JP2020/012786
§ 371 (c)(1),
(2) Date: Sep. 2, 2021

(87) PCT Pub. No.: WO2020/203424
PCT Pub. Date: Oct. 8, 2020

(65) Prior Publication Data
US 2022/0152593 A1 May 19, 2022

(30) Foreign Application Priority Data

Mar. 29, 2019 (JP) .................. 2019-068935

(51) Int. Cl.
*B01J 21/06* (2006.01)
*B01J 23/10* (2006.01)
(Continued)

(52) U.S. Cl.
CPC .............. *B01J 23/63* (2013.01); *B01J 21/066* (2013.01); *B01J 37/0215* (2013.01)

(58) Field of Classification Search
CPC . B01J 21/066; B01J 23/10; B01J 23/44; B01J 23/464; B01J 23/56; B01J 23/58;
(Continued)

(56) References Cited

U.S. PATENT DOCUMENTS 6,881,384 B1    4/2005   Jenishi et al.
7,084,086 B2 *  8/2006   Kasahara ............ B01J 37/0242
                                                        502/65
(Continued)

FOREIGN PATENT DOCUMENTS

CN          108472590 A      8/2018
EP          2 047 903 B1    10/2015
(Continued)

OTHER PUBLICATIONS

Nov. 16, 2022 Extended European Search Report issued in European Patent Application No. 20782686.8.
(Continued)

*Primary Examiner* — Cam N. Nguyen
(74) *Attorney, Agent, or Firm* — Oliff PLC

(57) ABSTRACT

This exhaust gas cleaning catalytic device includes a base material and a first catalyst coat layer on the base material. The first catalyst coat layer has a pre-stage section on an exhaust gas flow upstream side, and a post-stage section on an exhaust gas flow downstream side. The first catalyst coat layer pre-stage section and post-stage section each contain inorganic oxide particles and rhodium supported by the inorganic oxide particles, while at least some of the inorganic oxide particles contain ceria. The ceria amount per unit length of the first catalyst coat layer post-stage section is larger than the ceria amount per unit length of the first catalyst coat layer pre-stage section. The first catalyst coat layer pre-stage section is disposed in such a manner that the
(Continued)

end portion on the exhaust gas flow upstream side thereof is in direct contact with the exhaust gas flow.

18 Claims, 1 Drawing Sheet

(51) Int. Cl.
*B01J 23/44* (2006.01)
*B01J 23/46* (2006.01)
*B01J 23/56* (2006.01)
*B01J 23/58* (2006.01)
*B01J 23/63* (2006.01)
*B01J 35/00* (2006.01)
*B01J 35/04* (2006.01)
*F01N 3/10* (2006.01)
*B01D 53/94* (2006.01)
*B01J 37/02* (2006.01)

(58) Field of Classification Search
CPC ........ B01J 23/63; B01J 35/0006; B01J 35/04; B01D 53/944; B01D 53/945
USPC .................................. 502/304, 332, 334, 339
See application file for complete search history.

(56) References Cited

U.S. PATENT DOCUMENTS

| | | | | |
|---|---|---|---|---|
| 7,737,077 B2* | 6/2010 | Kitamura | ................ | B01J 23/40 502/262 |
| 7,998,896 B2* | 8/2011 | Kitamura | ............ | B01J 37/0244 502/355 |
| 8,039,418 B2* | 10/2011 | Kitamura | ............ | B01J 37/0244 502/328 |
| 8,133,837 B2* | 3/2012 | Yabuzaki | ................ | B01J 23/63 502/328 |
| 8,168,560 B2* | 5/2012 | Taki | ....................... | B01J 23/464 502/333 |
| 8,309,488 B2* | 11/2012 | Kitamura | ................ | B01J 23/63 502/355 |
| 8,546,296 B2* | 10/2013 | Yabuzaki | ............ | B01J 37/0248 428/116 |
| 8,741,799 B2* | 6/2014 | Matsueda | ............ | B01J 37/0244 502/170 |
| 9,174,198 B2* | 11/2015 | Kawabata | .............. | B01D 53/94 |
| 9,433,927 B2* | 9/2016 | Ikeda | .................. | B01D 53/945 |
| 9,440,223 B2* | 9/2016 | Aoki | .................... | B01J 35/0006 |
| 9,597,663 B2* | 3/2017 | Inoda | .................... | B01J 23/464 |
| 9,675,970 B2* | 6/2017 | Matsueda | ............ | B01D 53/945 |
| 9,694,348 B2* | 7/2017 | Hoshino | .............. | B01D 53/945 |
| 9,833,771 B2* | 12/2017 | Goto | .................... | B01J 35/0006 |
| 10,143,968 B2* | 12/2018 | Suzuki | .................. | C01F 17/224 |
| 10,376,839 B2* | 8/2019 | Umeno | ................ | B01J 37/0225 |
| 10,618,034 B2* | 4/2020 | Kasuya | .................... | B01J 23/63 |
| 10,737,219 B2* | 8/2020 | Onozuka | .................. | B01J 23/10 |
| 10,960,389 B2* | 3/2021 | Takesue | .................... | F01N 3/10 |
| 2006/0270549 A1* | 11/2006 | Sato | .................... | B01J 37/0244 502/302 |
| 2009/0209408 A1* | 8/2009 | Kitamura | ............... | B01J 23/002 502/328 |
| 2011/0082032 A1* | 4/2011 | Taki | .................... | B01J 35/0006 502/304 |
| 2016/0199816 A1 | 7/2016 | Matsueda et al. | | |
| 2016/0288100 A1* | 10/2016 | Goto | .................... | B01J 23/002 |
| 2019/0015820 A1 | 1/2019 | Kasuya et al. | | |
| 2019/0136730 A1* | 5/2019 | Onozuka | ............ | B01D 53/9445 |

FOREIGN PATENT DOCUMENTS

| | | |
|---|---|---|
| JP | 2001-62295 A | 3/2001 |
| JP | 2009-19537 A | 1/2009 |
| JP | 2010-5566 A | 1/2010 |
| JP | 2010-179200 A | 8/2010 |
| JP | 2011-212639 A | 10/2011 |
| JP | 2014-97459 A | 5/2014 |

OTHER PUBLICATIONS

Jun. 9, 2020 International Search Report issued in International Patent Application No. PCT/JP2020/012786.
Jun. 9, 2020 Written Opinion issued in International Patent Application No. PCT/JP2020/012786.
Sep. 28, 2021 International Preliminary Report on Patentability issued in International Patent Application No. PCT/JP2020/012786.

* cited by examiner

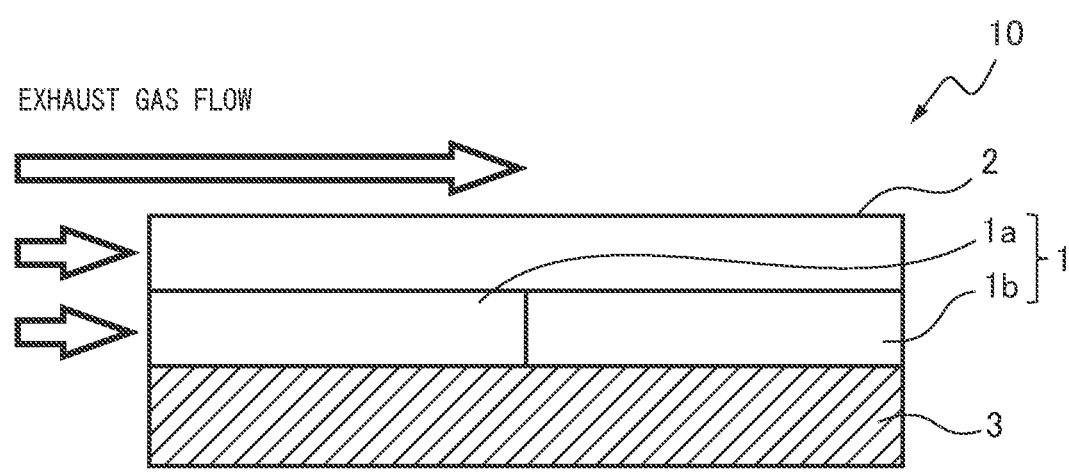

EXHAUST GAS CLEANING CATALYTIC DEVICE

FIELD

The present invention relates to an exhaust gas purification catalytic device.

BACKGROUND

Exhaust gas discharged from automobiles contains hydrocarbons (HCs), carbon monoxide (CO), and nitrogen oxides ($NO_x$), which are purified by an exhaust gas purification catalyst and then released into the atmosphere. As a catalyst for exhaust gas purification, for example, a catalyst having a catalytic coating layer on a surface of a honeycomb-shaped monolith substrate, has been known. The catalytic coating layer in such an exhaust gas purification catalyst comprises, for example, carrier particles and a noble metal catalyst supported on the carrier particles.

In actual driving, automobiles repeatedly accelerate and decelerate while running. During acceleration and deceleration, the air-fuel ratio (A/F) rapidly increases or decreases, which affects, for example, the purification rate of HCs. Therefore, for the purpose of mitigating fluctuations of the A/F value due to acceleration/deceleration, a technique of blending a material (OSC material) that exhibits oxygen storage capacity within the catalytic coating layer is known.

PTL 1, for example, discloses a catalyst for exhaust gas purification comprising a honeycomb-shaped monolith having thereon a lower layer and an upper layer, wherein a layer comprising a Rh/OSC material, which consists of Rh (rhodium) supported on an OSC material, is arranged in the lower layer and a layer comprising Pd/alumina, which consists of Pd supported on alumina, is arranged in the upper layer. PTL 1 describes that due to this configuration, it is easier to keep the upper layer Pd in an oxidized state, and as a result, the low-temperature HC purification ability is improved.

PTL 2 discloses a catalyst for exhaust gas purification comprising a substrate having thereon a first catalyst layer, which is a lower layer, comprising Pt or Pd and a second catalyst layer, which is an upper layer, comprising Rh on the first catalyst layer, wherein the first catalyst layer has an upstream portion and a downstream portion, and the ratio (upstream portion/downstream portion) of OSC material of the upstream portion to the downstream portion is 1<(upstream portion/downstream portion)<9. PTL 2 describes that due to this configuration, high $NO_x$ purification ability can be obtained, because the oxygen occlusion reaction is promoted in the upstream side of the exhaust gas flow, fluctuations of the A/F value of the exhaust gas can be mitigated, and the exhaust gas in which the fluctuations of the A/F value are mitigated is supplied to the downstream side.

PTL 3 discloses a catalyst for exhaust gas purification comprising a substrate having thereon a palladium support layer, a low OSC ability rhodium support layer, and a high OSC ability rhodium support layer, wherein the low OSC rhodium layer is arranged on the exhaust gas flow downstream side of the palladium support layer, and the high OSC rhodium layer is arranged on the exhaust gas flow downstream side of the low OSC rhodium layer. PTL 3 describes that due to this configuration, when the air-fuel ratio is in a stoichiometric to rich state, hydrogen generated from the palladium support layer is supplied to the rhodium support layer to promote the reduction of rhodium.

CITATION LIST

Patent Literature

[PTL 1] Japanese Unexamined Patent Publication (Kokai) No. 2010-5566
[PTL 2] Japanese Unexamined Patent Publication (Kokai) No. 2011-212639
[PTL 3] Japanese Unexamined Patent Publication (Kokai) No. 2010-179200

SUMMARY

Technical Problem

Regulations on exhaust gas discharged from automobiles have become stricter year after year. Test cycles in a mode closer to actual driving have been adopted as tests of exhaust gas purification ability. For example, the European Parliament has adopted the RDE (Real Driving Emissions) Regulation, and the U.S. Environmental Protection Agency has established modes such as LA #4. Specifically, the demand for $NO_x$ purification ability has been increasing.

Also, the demand for improved fuel efficiency and the number of vehicles which are controlled to stop warm-up operation when stopped have increased steadily.

In such circumstances, improvements in the HC purification ability in a low-temperature state at engine start, the $NO_x$ purification ability in the transitional period after engine restart, and the $NO_x$ purification ability in a region where the space velocity (SV) is high are required. However, the performance of each thereof is still insufficient in the case of the exhaust gas purification catalysts proposed in the prior art.

In view of the above circumstances, an object of the present invention is to provide an exhaust gas purification catalytic device having high low-temperature HC purification ability and high $NO_x$ purification ability in the transitional period and high SV region.

Solution to Problem

The present invention will now be described in detail, as below.

Aspect 1

An exhaust gas purification catalytic device, comprising a substrate and a first catalytic coating layer on the substrate, wherein the first catalytic coating layer comprises a first catalytic coating layer upstream portion on an exhaust gas flow upstream side and a first catalytic coating layer downstream portion on an exhaust gas flow downstream side, wherein the first catalytic coating layer upstream portion and the first catalytic coating layer downstream portion each comprise inorganic oxide particles and rhodium supported on the inorganic oxide particles, wherein at least a part of the inorganic oxide particles contains ceria, wherein the ceria content per unit length of the first catalytic coating layer downstream portion is greater than the ceria content per unit length of the first catalytic coating layer upstream portion, and wherein the first catalytic coating layer upstream portion is arranged such that an end portion on the exhaust gas flow upstream side is in direct contact with an exhaust gas flow.

Aspect 2

The exhaust gas purification catalytic device according to Aspect 1, wherein the ceria of the first catalytic coating layer is contained in particles of one or more inorganic oxides selected from pure ceria and a composite oxide containing ceria.

Aspect 3

The exhaust gas purification catalytic device according to Aspect 2, wherein the composite oxide containing ceria is a ceria-zirconia composite oxide.

Aspect 4

The exhaust gas purification catalytic device according to any one of Aspects 1 to 3, wherein a second catalytic coating layer is further provided on the first catalytic coating layer.

Aspect 5

The exhaust gas purification catalytic device according to Aspect 4, wherein the second catalytic coating layer comprises inorganic oxide particles and rhodium and palladium supported on the inorganic oxide particles, and wherein at least a part of the inorganic oxide particles in the second catalytic coating layer contains ceria.

Aspect 6

The exhaust gas purification catalytic device according to Aspect 5, wherein the ceria of the second catalytic coating layer is contained in particles of one or more inorganic oxides selected from pure ceria and a composite oxide containing ceria.

Aspect 7

The exhaust gas purification catalytic device according to Aspect 6, wherein the composite oxide containing ceria is a ceria-zirconia composite oxide.

Aspect 8

The exhaust gas purification catalytic device according to any one of Aspects 5 to 7, wherein the ceria content per unit length of the second catalytic coating layer is greater than the ceria content per unit length of the first catalytic coating layer downstream portion.

Aspect 9

The exhaust gas purification catalytic device according to Aspect 6 or 7, wherein the rhodium in the second catalytic coating layer is supported on particles of one or more inorganic oxides selected from pure ceria and the composite oxide containing ceria, and wherein the palladium of the second catalytic coating layer is supported on particles of an inorganic oxide other than the pure ceria and the composite oxide containing ceria.

Aspect 10

The exhaust gas purification catalytic device according to any one of Aspects 4 to 9, wherein the second catalytic coating layer comprises an alkaline earth metal compound.

Aspect 11

The exhaust gas purification catalytic device according to any one of Aspects 1 to 10, wherein the first catalytic coating layer is substantially free of an alkaline earth metal compound.

Aspect 12

The exhaust gas purification catalytic device according to any one of Aspects 1 to 11, wherein the molar ratio of the rhodium content per unit length of the first catalytic coating layer downstream portion to the rhodium content per unit length of the first catalytic coating layer upstream portion is 0.8 to 1.2.

Aspect 13

The exhaust gas purification catalytic device according to any one of Aspects 1 to 12, wherein the length of the first catalytic coating layer upstream portion is 30% to 70% of the total length of the first catalytic coating layer.

Advantageous Effects of Invention

The exhaust gas purification catalyst of the present invention has excellent low-temperature HC purification ability and $NO_x$ purification ability in the transitional period and high SV region.

BRIEF DESCRIPTION OF DRAWINGS

FIG. 1 is a schematic cross-sectional view for describing an example of the structure of the exhaust gas purification catalytic device of the present invention.

DESCRIPTION OF EMBODIMENTS

Exhaust Gas Purification Catalytic Device

The exhaust gas purification catalytic device of the present invention comprises a substrate and a first catalytic coating layer on the substrate, wherein the first catalytic coating layer comprises a first catalytic coating layer upstream portion on an exhaust gas flow upstream side and a first catalytic coating layer downstream portion on an exhaust gas flow downstream side, wherein the first catalytic coating layer upstream portion and the first catalytic coating layer downstream portion each comprise inorganic oxide particles and rhodium supported on the inorganic oxide particles, wherein at least a part of the inorganic oxide particles contains ceria, wherein the ceria content per unit length of the first catalytic coating layer downstream portion is greater than the ceria content per unit length of the first catalytic coating layer upstream portion, and wherein the first catalytic coating layer upstream portion is arranged such that an end portion on the exhaust gas flow upstream side is in direct contact with an exhaust gas flow.

Ceria, as a representative material which exhibits OSC ability, is often blended into an exhaust gas purification catalyst. When a catalytic coating layer comprises ceria, it is expected that fluctuations in the air-fuel ratio are mitigated and a stable exhaust gas purification performance is exhibited. However, when ceria content is excessively large, although the ability to mitigate the fluctuations in the air-fuel ratio is excellent, the metallization of rhodium may be inhibited and $NO_x$ reduction and purification ability may be impaired. On the other hand, when ceria content is excessively small, the effect of mitigating the fluctuations in the air-fuel ratio is insufficient, and the amount of HCs adsorbed increases due to a decrease in the number of base sites. Thus, there is a concern regarding HC poisoning of active sites.

In the exhaust gas purification catalytic device of the present invention, the ceria content per unit length of the first catalytic coating layer downstream portion is configured to be greater than the ceria content per unit length of the first catalytic coating layer upstream portion. According to this configuration, in the upstream portion, the metallization of Rh can be promoted at engine start and restart while HC poisoning is avoided due to the required number of base sites. In the downstream portion, the large amount of ceria sufficiently mitigates fluctuations in the air-fuel ratio and high exhaust gas purification ability is exhibited.

The exhaust gas purification catalytic device of the present invention may further comprise a second catalytic coating layer on the first catalytic coating layer. The second catalytic coating layer may comprise inorganic oxide particles and rhodium and palladium supported on the inorganic oxide particles, and at least a part of the inorganic oxide particles in the second catalytic coating layer may contain ceria. By including both rhodium and palladium in the second catalytic coating layer as an upper layer, the frequency of contact between the exhaust gas and these noble metal catalysts can be ensured at a high level, and, for example, exhaust gas purification ability at low temperature can be maintained at a high state.

FIG. 1 shows a schematic cross-section of an exhaust gas purification catalytic device according to a preferred embodiment of the present invention.

The exhaust gas purification catalytic device (10) of FIG. 1 comprises
a substrate (3) and a first catalytic coating layer (1) on the substrate (3),
wherein the first catalytic coating layer (1) comprises a first catalytic coating layer upstream portion (1a) on an exhaust gas flow upstream side and a first catalytic coating layer downstream portion (1b) on an exhaust gas flow downstream side,
wherein the first catalytic coating layer upstream portion (1a) and the first catalytic coating layer downstream portion (1b) each comprise inorganic oxide particles and rhodium supported on the inorganic oxide particles, and at least a part of the inorganic oxide particles contains ceria,
wherein the ceria content per unit length of the first catalytic coating layer downstream portion (1b) is greater than the ceria content per unit length of the first catalytic coating layer upstream portion (1a), and
wherein the first catalytic coating layer upstream portion (1a) is arranged such that an end portion on the exhaust gas flow upstream side is in direct content with an exhaust gas flow.

The exhaust gas purification catalytic device (10) of FIG. 1 further comprises a second catalytic coating layer (2) on the first catalytic coating layer (1). The second catalytic coating layer (2) may comprise inorganic oxide particles and rhodium and palladium supported on the inorganic oxide particles. At least a part of the inorganic oxide particles in the second catalytic coating layer (2) may contain ceria.

Hereinafter, the elements constituting the exhaust gas purification catalytic device of the present invention will be described in detail and in order.

Substrate

For the substrate in the exhaust gas purification catalytic device of the present invention, a substrate commonly used as the substrate of an exhaust gas purification catalytic device can be used. The substrate may be, for example, a straight-type or wall flow-type monolith honeycomb substrate made of a material such as cordierite, SiC, stainless steel, and inorganic oxide particles.

First Catalytic Coating Layer

The first catalytic coating layer comprises a first catalytic coating layer upstream portion on an exhaust gas flow upstream side and a first catalytic coating layer downstream portion on an exhaust gas flow downstream side,
wherein the first catalytic coating layer upstream portion and the first catalytic coating layer downstream portion each comprise inorganic oxide particles and rhodium supported on the inorganic oxide particles,
wherein at least a part of the inorganic oxide particles contains ceria,
wherein the ceria content per unit length of the first catalytic coating layer downstream portion is greater than the ceria content per unit length of the first catalytic coating layer upstream portion, and
wherein the first catalytic coating layer upstream portion is arranged such that an end portion on the exhaust gas upstream side is in direct contact with an exhaust gas flow.

The first catalytic coating layer may be present over the entire length of the substrate, or may be present only on a portion of the region in the substrate length direction. From the viewpoint of increasing exhaust gas purification efficiency per unit volume of the exhaust gas purification catalytic device, the first catalytic coating layer may be present on a region of 80% or greater, 85% or greater, 90% or greater, 95% or greater, or 100% of the substrate length.

The first catalytic coating layer comprises a first catalytic coating layer upstream portion on an exhaust gas flow upstream side and a first catalytic coating layer downstream portion on an exhaust gas flow downstream side.

The length of the first catalytic coating layer upstream portion may be, for example, 30% or greater, 35% or greater, 40% or greater, 45% or greater, 50% or greater, 55% or greater, 60% or greater, or 65% or greater, and, for example, 70% or less, 65% or less, 60% or less, 55% or less, 50% or less, 45% or less, 40% or less, or 35% or less of the total length of the first catalytic coating layer.

The length of the first catalytic coating layer downstream portion may be a length obtained by subtracting the length of the first catalytic coating layer upstream portion from the total length of the first catalytic coating layer.

The first catalytic coating layer upstream portion and the first catalytic coating layer downstream portion each comprise inorganic oxide particles, and at least a part of the inorganic oxide particles contains ceria. The ceria in the first catalytic coating layer may be contained in particles of one or more inorganic oxides selected from pure ceria and a composite oxide containing ceria. The composite oxide containing ceria may be a composite oxide containing one or more metal elements selected from, for example, cerium, aluminum, silicon, titanium, zirconium, and rare earth elements. The composite oxide is preferably a composite oxide containing cerium and zirconium, and more preferably a composite oxide of cerium and zirconium (ceria-zirconia composite oxide).

The ceria concentration in the composite oxide containing ceria may be appropriately set in accordance with the desired value of ceria concentration contained in the coating layer, and can be exemplified in the range of, for example, 10% to 90% by mass.

The ceria in the first catalytic coating layer may comprise a portion contained in particles of pure ceria and a portion contained in particles of the composite oxide containing ceria.

The ceria content (ceria concentration) per unit length of the first catalytic coating layer downstream portion is greater than the ceria content (ceria concentration) per unit length of the first catalytic coating layer upstream portion. The ratio $([CeO_2]_{Rr}/[CeO_2]_{Fr})$ of the ceria concentration $([CeO_2]_{Rr})$ in the first catalytic coating layer downstream portion to the ceria concentration $([CeO_2]_{Fr})$ in the first catalytic coating layer upstream portion may be, for example, 1.1 or greater, 1.2 or greater, 1.4 or greater, 1.7 or greater, 2.0 or greater, or 2.5 or greater, such that the advantage of setting the ceria concentration in the downstream portion greater than the ceria concentration in the upstream portion is expressed effectively. When the ceria concentration in the upstream portion is excessively small, the effect of mitigating fluctuations in the air-fuel ratio in the first catalytic coating layer upstream portion becomes insufficient, and there is a concern that the amount of HCs adsorbed increases due to a decrease in the number of base sites. From the viewpoint of avoiding this concern, the ratio ($[CeO_2]_{Rr}/[CeO_2]_{Fr}$) of the ceria concentration in the first catalytic coating layer downstream portion to the ceria concentration in the first catalytic coating layer upstream portion may be, for example, 3.0 or less, 2.5 or less, 2.0 or less, 1.7 or less, or 1.4 or less.

As the ceria content in the first catalytic coating layer, the mass ratio (g/L), which is the total mass (g) of ceria contained in the first catalytic coating layer upstream portion and the first catalytic coating layer downstream portion allocated per 1 L of substrate capacity, may be, for example, 5 g/L or more, 6 g/L or more, 7 g/L or more, 8 g/L or more, 9 g/L or more, or 10 g/L or more, and may be, for example, 20 g/L or less, 18 g/L or less, 16 g/L or less, 14 g/L or less, or 12 g/L or less.

When the ceria in the first catalytic coating layer is contained in particles of the composite oxide containing ceria, the "ceria content" refers to the mass of ceria (cerium (IV) oxide, $CeO_2$) converted from the elemental cerium in the composite oxide.

The first catalytic coating layer upstream portion and the first catalytic coating layer downstream portion each comprise rhodium.

From the viewpoint of increasing the $NO_x$ purification ability at both low temperature and high SV, the rhodium content (rhodium concentration) per unit length of the first catalytic coating layer downstream portion and the rhodium content (rhodium concentration) per unit length of the first catalytic coating layer upstream portion may be approximately the same. Specifically, the molar ratio of the rhodium concentration in the first catalytic coating layer downstream portion to the rhodium concentration in the first catalytic coating layer upstream portion may be, for example, 0.8 or greater, 0.9 or greater, or 1.0 or greater, and may be, for example, 1.2 or less, 1.1 or less, or 1.0 or less.

As the rhodium content in the first catalytic coating layer, the mass ratio (g/L), which is the total mass (g) of rhodium contained in the first catalytic coating layer upstream portion and the first catalytic coating layer downstream portion allocated per 1 L of substrate capacity, may be, for example, 0.01 g/L or more, 0.05 g/L or more, 0.10 g/L or more, 0.15 g/L or more, or 0.20 g/L or more, and may be, for example, 0.40 g/L or less, 0.35 g/L or less, 0.25 g/L or less, or 0.20 g/L or less.

The rhodium in the first catalytic coating layer may be supported preferably as microparticles on one or more particles selected from pure ceria, a composite oxide containing ceria, and inorganic oxides described below.

The first catalytic coating layer may or may not comprise a noble metal catalyst other than rhodium. The first catalytic coating layer is preferably substantially free of a noble metal catalyst other than rhodium. When the first catalytic coating layer is "substantially free" of a noble metal catalyst other than rhodium, the ratio of the mass of the noble metal catalyst other than rhodium to the total mass of the noble metal catalyst contained in the first catalytic coating layer is, for example, 5% by mass or less, 3% by mass or less, 1% by mass or less, 0.5% by mass or less, 0.3% by mass or less, 0.1% by mass or less, or 0% by mass.

The inorganic oxide particles in the first catalytic coating layer, other than particles of one or more inorganic oxides selected from pure ceria and a composite oxide containing ceria described above, may contain particles of an inorganic oxide other than ceria and a composite oxide containing ceria.

The particles of the inorganic oxide other than ceria and a composite oxide containing ceria may be particles of an oxide of one or more selected from, for example, aluminum, silicon, titanium, zirconium, and rare earth elements. The inorganic oxide particles are preferably particles of one or more inorganic oxides selected from alumina, silica, silica-alumina, zeolite, titania, zirconia, ceria, and oxides of rare earth elements other than ceria. The inorganic oxide particles preferably contain metal oxide particles, and particularly preferably contain alumina particles.

The first catalytic coating layer may comprise other components in addition to the inorganic oxide particles described above and rhodium supported on the inorganic oxide. Other components may be, for example, an alkaline earth metal compound and a binder.

The first catalytic coating layer may or may not comprise an alkaline earth metal compound. The first catalytic coating layer is preferably substantially free of an alkaline earth metal compound. When the first catalytic coating layer is "substantially free" of a compound of an alkaline earth element, the ratio of the total mass of a compound of an alkaline earth element to the total mass of the first catalytic coating layer is, for example, 5% by mass or less, 3% by mass or less, 1% by mass or less, 0.5% by mass or less, 0.3% by mass or less, 0.1% by mass or less, or 0% by mass or less.

The first catalytic coating layer may comprise a binder. The binder may be, for example, alumina sol, zirconia sol, silica sol, or titania sol.

The first catalytic coating layer upstream portion is arranged such that an end portion on the exhaust gas flow upstream side is in direct contact with an exhaust gas flow. By having such a configuration, the exhaust gas purification catalytic device of the present invention can avoid HC poisoning due to a required number of base sites at low temperature while promoting metallization of Rh, and is thus able to effectively enjoy an advantage of the present invention.

The requirement that the first catalytic coating layer upstream portion "is arranged such that an end portion on the exhaust gas flow upstream side is in direct contact with an exhaust gas flow" is particularly significant when the exhaust gas purification catalytic device of the present invention further comprises a second catalytic coating layer on the first catalytic coating layer.

Second Catalytic Coating Layer

The exhaust gas purification catalytic device of the present invention may further comprise a second catalytic coating layer on the first catalytic coating layer.

The second catalytic coating layer may be present over the entire length of the substrate, or may be present only in a portion of the region in the substrate length direction. From the viewpoint of increasing exhaust has purification efficiency per unit volume of the exhaust gas purification catalytic device, the second catalytic coating layer may be present on a region of 80% or greater, 85% or greater, 90% or greater, 95% or greater, or 100% of the substrate length. However, since the exhaust gas purification catalytic device of the present invention is required to have the first catalytic coating layer arranged such that an end portion on the exhaust gas flow upstream side thereof is in direct contact with the exhaust gas flow, it is preferable that the second catalytic coating layer does not have a region directly arranged on the substrate without going through the first catalytic coating layer, at least in the vicinity of the end portion on the exhaust gas flow upstream side in the exhaust gas purification catalytic device.

The second catalytic coating layer may comprise inorganic oxide particles and rhodium and palladium supported on the inorganic oxide particles. Besides these, the second catalytic coating layer may further comprise an alkaline earth metal compound.

The second catalytic coating layer may comprise inorganic oxide particles, and at least a part of the inorganic oxide particles may contain ceria. The ceria in the second catalytic coating layer may be contained in particles of one or more inorganic oxides selected from pure ceria and a composite oxide containing ceria. The composite oxide in the first catalytic coating layer may be adopted as-is for the composite oxide containing ceria. Thus, the composite oxide containing ceria in the second catalytic coating layer is preferably a ceria-zirconia, and may be a particulate material.

The inorganic oxide particles of the second catalytic coating layer, other than particles of one or more inorganic oxides selected from pure ceria and a composite oxide containing ceria described above, may contain particles of an inorganic oxide other than ceria and a composite oxide containing ceria. The inorganic oxide in the first catalytic coating layer may be adopted as-is for the particles of the inorganic oxide other than ceria and a composite oxide containing ceria. The particles of the inorganic oxide other than ceria and a composite oxide containing ceria in the second catalytic coating layer may contain metal oxide particles, particularly alumina particles.

The ceria content (ceria concentration) per unit length of the second catalytic coating layer may be greater than the ceria content (ceria concentration) per unit length of the first catalytic coating layer downstream portion. From the viewpoint of effectively expressing 25 the OSC ability of ceria in the second catalytic coating layer, which is an upper layer in direct contact with the exhaust gas, the ratio ($[CeO_2]_{Up}/[CeO_2]_{Rr}$) of the ceria concentration ($[CeO_2]_{Up}$) in the second catalytic coating layer to the ceria concentration ($[CeO_2]_{Rr}$) in the first catalytic coating layer downstream portion may be, for example, 1.1 or greater, 1.2 or greater, 1.3 or greater, 1.4 or greater, or 1.5 or greater. From the viewpoint of not inhibiting the metallization of rhodium 30 in the second catalytic coating layer, the ratio ($[CeO_2]_{Up}/[CeO_2]_{Rr}$) of the ceria concentration in the second catalytic coating layer to the ceria concentration in the first catalytic coating layer downstream portion may be, for example, 2.0 or less, 1.9 or less, 1.8 or less, 1.7 or less, or 1.6 or less.

From the same viewpoints, the ratio ($[CeO_2]_{Up}/[CeO_2]_{Fr}$) of the ceria concentration ($[CeO_2]_{Up}$) in the second catalytic coating layer to the ceria concentration ($[CeO_2]_{Fr}$) in the first catalytic coating layer upstream portion may be, for example, 1.5 or greater, 1.8 or greater, 2.0 or greater, 2.3 or greater, or 2.5 or greater, and may be, for example, 5.0 or less, 4.5 or less, 4.0 or less, 3.5 or less, 3.0 or less, or 2.5 or less.

As the ceria content in the second catalytic coating layer, the mass ratio (g/L), which is the total mass (g) of ceria contained in the second catalytic coating layer allocated per 1 L of substrate capacity, may be, for example, 10 g/L or more, 12 g/L or more, 14 g/L or more, 16 g/L or more, or 18 g/L or more, and may be, for example, 30 g/L or less, 28 g/L or less, 26 g/L or less, 24 g/L or less, 22 g/L or less, or 20 g/L or less.

The second catalytic coating layer may comprise rhodium.

As the rhodium content in the second catalytic coating layer, the mass ratio (g/L), which is the total mass (g) of ceria contained in the second catalytic coating layer allocated per 1 L of substrate capacity, may be, for example, 0.10 g/L or more, 0.15 g/L or more, 0.20 g/L or more, 0.25 g/L or more, or 0.30 g/L or more, and may be, for example, 0.50 g/L or less, 0.45 g/L or less, 0.40 g/L or less, 0.35 g/L or less, or 0.30 g/L or less.

The mass ratio of the rhodium content in the second catalytic coating layer allocated per 1 L of substrate capacity may be over 1.0 times, 1.1 times or greater, 1.2 times or greater, 1.3 times or greater, 1.4 times or greater, or 1.5 times or greater, and may be 2.0 times or less, 1.9 times or less, 1.8 times or less, 1.7 times or less, 1.6 times or less, or 1.5 times or less of the mass ratio (g/L) of the total mass of rhodium contained in the first catalytic coating layer upstream portion and the first catalytic coating layer downstream portion.

The second catalytic coating layer may comprise palladium.

The palladium content in the second catalytic coating layer, as the mass ratio (g/L) of the mass of palladium contained in the second catalytic coating layer allocated per 1 L of substrate capacity, may be, for example, 0.1 g/L or more 0.3 g/L or more, 0.5 g/L or more, 0.6 g/L or more, or 0.7 g/L, and may be, for example, 1.5 g/L or less, 1.4 g/L or less, 1.3 g/L or less, 1.2 g/L or less, 1.1 g/L or less, or 1.0 g/L or less.

The rhodium and palladium in the second catalytic coating layer may each be supported on particles selected from one or more of the inorganic oxides described above, preferably as microparticles.

In the exhaust gas purification catalytic device of the present invention, the rhodium and palladium in the second catalytic coating layer are preferably supported on the respective separate inorganic oxides, from the viewpoint of suppressing degradation of catalytic activity due to alloying of rhodium with palladium.

From this viewpoint, in the second catalytic coating layer, rhodium, preferably as microparticles, is supported on particles of one or more inorganic oxides selected from pure ceria and a composite oxide containing ceria and palladium, preferably as microparticles, is on particles of one or more inorganic oxides other than pure ceria and a composite oxide containing ceria.

The second catalytic coating layer may or may not comprise a noble metal catalyst other than rhodium and palladium. The second catalytic coating layer is preferably substantially free of a noble metal catalyst other than rhodium and palladium. When the second catalytic coating layer is "substantially free" of a noble metal catalyst other than rhodium and palladium, the ratio of the mass of the noble metal catalyst other than rhodium and palladium to the total mass of the noble metal catalyst contained in the second catalytic coating layer is, for example, 5% by mass or less, 3% by mass or less, 1% by mass or less, 0.5% by mass or less, 0.3% by mass or less, 0.1% by mass or less, or 0% by mass.

The second catalytic coating layer may further comprise an alkaline earth metal compound.

The alkaline earth metal compound contained in the second catalytic coating layer may be, for example, a calcium compound, a barium compound, or a strontium compound. Sulfates, nitrates, carbonates, oxoacids, and oxides thereof may be used. The alkaline earth metal compound is preferably one or more selected from barium compounds and strontium compounds, and is more preferably a barium sulfate or a strontium sulfate.

The second catalytic coating layer may further comprise other components other than the inorganic oxide particles, rhodium, palladium, and as an optional component, an alkaline earth metal compound. Other components may include, for example, a binder. For the binder, the binder in the first catalytic coating layer may be adopted as-is.

Method for Manufacturing Exhaust Gas Purification Catalytic Device

The exhaust gas purification catalytic device may be manufactured by any method.

The exhaust gas purification catalytic device, for example, may be manufactured by a method of sequentially forming, on a substrate, a first catalytic coating layer (upstream portion and downstream portion) and a second catalytic coating layer.

Substrate

As the substrate, a desired substrate which an exhaust gas purification catalytic device should have may be selected and used. As described above, the substrate is, for example, a straight-type or wall flow-type monolith honeycomb substrate made of cordierite, SiC, stainless steel, or inorganic oxide particles.

Forming the First Catalytic Coating Layer

The upstream portion and the downstream portion of the first catalytic coating layer are formed on such a substrate.

The first catalytic coating layer upstream portion may be formed by, for example, coating up to a predetermined range of the total length of the substrate from the end portion of the exhaust gas flow upstream side of the substrate with a coating liquid for forming the first catalytic coating layer upstream portion, followed by drying and baking. The first catalytic coating layer downstream portion may be formed by, for example, coating up to a predetermined range of the total length of the substrate from the end portion of the exhaust gas flow downstream side of the substrate with a coating liquid for forming the first catalytic coating layer downstream portion, followed by drying and baking. The upstream portion and the downstream portion of the first catalytic coating layer may be formed in any order.

Alternatively, another method may be used in which up to a predetermined range of the total length of the substrate from the end portion of the exhaust gas flow upstream side is coated with the coating liquid for forming the first catalytic coating layer upstream portion and thereafter dried; subsequently, up to a predetermined range of the total length of the substrate from the end portion of the exhaust gas flow downstream side is coated with the coating liquid for forming the first catalytic coating layer downstream portion and thereafter dried, and then the upstream portion and the downstream portion are baked together. The coating order of the liquid for forming the upstream portion and the coating liquid for forming the downstream portion may be reversed from what is described above.

The coating liquid for forming the first catalytic coating layer upstream portion and the coating liquid for forming the first catalytic coating layer downstream portion may each be a liquid composed of a suitable solvent (for example, water) in which desired components contained in the first catalytic coating layer upstream portion or downstream portion are dissolved or dispersed. It is preferable that the rhodium in the first catalytic coating layer be preliminarily supported on inorganic oxide particles and contained as rhodium supported inorganic oxide particles in the coating liquid.

The rhodium supported inorganic oxide particles can be obtained by, for example, charging a rhodium precursor and inorganic oxide particles in a suitable solvent (for example, water), followed by drying and baking. The rhodium precursor may be, for example, rhodium nitrate, rhodium chloride, rhodium sodium chloride, rhodium pentaamine chloride, or carbonyl acetyl rhodium.

Coating of the coating liquid, and drying and baking after coating may each be carried out according to a publicly known method.

Forming the Second Catalytic Coating Layer

The second catalytic coating layer is subsequently formed on the substrate having the first catalytic coating layer formed thereon.

The second catalytic coating layer may be formed by, for example, coating the substrate having the first catalytic coating layer formed thereon with a coating liquid for forming the second catalytic coating layer, followed by drying and baking.

The coating liquid for the second catalytic coating layer may be a liquid composed of a suitable solvent (for example, water) in which desired components contained in the second catalytic coating layer are dissolved or dispersed. It is preferable that the rhodium and palladium in the second catalytic coating layer be preliminarily supported on inorganic oxide particles and contained as rhodium supported inorganic particles and palladium supported inorganic oxide particles, respectively, in the coating liquid.

The rhodium supported inorganic oxide particles can be obtained by the same method described for the coating liquid for the first catalytic coating layer.

The palladium supported inorganic oxide particles can be obtained by, for example, charging a palladium precursor and inorganic oxide particles in a suitable solvent (for example, water), followed by drying and baking. The palladium precursor may be, for example, palladium nitrate, palladium sulfate, or palladium chloride.

Coating of the coating liquid, and drying and baking after coating may each be carried out according to a publicly known method.

The exhaust gas purification catalytic device of the present invention can be manufactured according to the above method. However, the method described above is merely one example of the method for manufacturing the exhaust gas purification catalytic device of the present invention. The exhaust gas purification catalytic device of the present invention may be manufactured according to any method other than the one described above.

EXAMPLES

I. Examining Single-Layer Catalyst

Example 1

Manufacturing the Exhaust Gas Purification Catalytic Device
(Preparing the Coating Liquid for Forming the First Catalytic Coating Layer Upstream Portion)

Rhodium nitrate in an amount equivalent to 0.10 g of Rh metal and 11 g (equivalent to 2.30 g of ceria) of ceria-zirconia composite oxide particles (ceria content of 20% by mass) were charged in pure water, stirred, and thereafter dried and baked to obtain 11.1 g of rhodium supported ceria-zirconia composite oxide particles. The entire amount of the obtained rhodium supported ceria-zirconia composite oxide particles, 25 g of alumina particles, and alumina sol as a binder were charged in pure water and stirred to prepare a coating liquid for forming the first catalytic coating layer upstream portion.

(Preparing the Coating Liquid for Forming the First Catalytic Coating Layer Downstream Portion)

Except that 28 g (equivalent to 5.70 g of ceria) of particles of the ceria-zirconia composite oxide having a ceria content of 20% by mass were used, a coating liquid for forming the first catalytic coating layer downstream portion was prepared in the same manner as the above "Preparing the coating liquid for forming the first catalytic coating layer upstream portion".

(Forming the Coating Layer)

A honeycomb substrate made of cordierite, having a diameter of 108 m and a length of 76 mm (capacity of 700 mL), was coated with the coating liquid for forming the first catalytic coating layer upstream portion in a range of 38 mm (50% of the total length of the substrate) from the exhaust gas flow upstream side, dried, and thereafter baked to form the first catalytic coating layer upstream portion. The ceria concentration (mass of ceria per unit length) in the first catalytic coating layer upstream portion (length of 38 mm) was 0.060 g/mm-upstream portion.

The honeycomb substrate having formed thereon the first catalytic coating layer upstream portion was coated with the coating liquid for forming the first catalytic coating layer downstream portion in a range of 38 mm (50% of the total length of the substrate) from the exhaust gas flow downstream side, dried, and thereafter baked to form the first catalytic coating layer downstream portion and thereby manufacture the exhaust gas purification catalytic device of Example 1. The ceria concentration (mass of ceria per unit length) in the first catalytic coating layer downstream portion (length of 38 mm) of the exhaust gas purification catalytic device was 0.150 g/mm-upstream portion.

In the exhaust gas purification catalytic device of Example 1, the ratio ($[CeO_2]_{Rr}/[CeO_2]_{Fr}$) of the ceria concentration in the first catalytic coating layer downstream portion ($[CeO_2]_{Rr}$) to the ceria concentration in the first catalytic coating layer upstream portion ($[CeO_2]_{Fr}$) was 2.50.

Evaluating Exhaust Gas Purification Performance

The obtained exhaust gas purification catalytic device was mounted on an engine having a displacement of 4.0 L for catalytic endurance running. After steady endurance running was carried out for 100 hours, the exhaust gas purification catalytic device was mounted in an actual vehicle having a displacement of 1.0 L. Exhaust gas purification performance was evaluated based on the running pattern of the LA #4 mode, and the $NO_x$ emission was measured. The cold and hot $NO_x$ emissions are shown in Table 1.

Examples 2 and 3 and Comparative Examples 1 to 3

Each coating liquid was prepared in the same manner as in Example 1 to manufacture the exhaust gas purification catalytic device, except that when preparing the coating liquid for forming the first catalytic coating layer upstream portion and the coating liquid for forming the first catalytic coating layer downstream portion, the ceria content of the ceria-zirconia composite oxide contained in each coating liquid was changed to the ceria content in each coating liquid as indicated in Table 1. In Comparative Example 3, the length of the first catalytic coating layer upstream portion was set to 76 mm (100% of the total length of the substrate), and no coating layer downstream portion was provided.

Exhaust gas purification performance was evaluated in the same manner as in Example 1, using the obtained exhaust gas purification catalytic device. The results, with the ratios of the ceria concentration in the first catalytic coating layer downstream portion to the ceria concentration in the first catalytic coating layer upstream portion, are shown in Table 1.

TABLE 1

| | First catalytic coating layer | | | | | | | | Exhaust gas purification performance | |
|---|---|---|---|---|---|---|---|---|---|---|
| | Upstream portion | | | | Downstream portion | | | | | |
| | | Rh | | Ceria | | Rh | | Ceria | | | |
| | Length ratio (%) | Weight (g) | Weight (g) | Ceria concentration (g/mm-upstream portion) | Length ratio (%) | Weight (g) | Weight (g) | Ceria concentration (g/mm-downstream portion) | Ceria concentration ratio $[CeO_2]_{Rr}/[CeO_2]^{Fr}$ | Cold NOx (mg/mile) | Hot NOx (mg/mile) |
| Ex. 1 | 50 | 0.10 | 2.30 | 0.060 | 50 | 0.10 | 5.70 | 0.150 | 2.50 | 39.0 | 6.0 |
| Ex. 2 | 50 | 0.10 | 2.90 | 0.076 | 50 | 0.10 | 5.10 | 0.134 | 1.76 | 39.2 | 6.0 |
| Ex. 3 | 50 | 0.10 | 3.40 | 0.089 | 50 | 0.10 | 4.60 | 0.121 | 1.36 | 39.7 | 6.5 |
| Comp. Ex. 1 | 50 | 0.10 | 4.00 | 0.105 | 50 | 0.10 | 4.00 | 0.105 | 1.00 | 41.0 | 6.7 |
| Comp. Ex. 2 | 50 | 0.10 | 4.60 | 0.121 | 50 | 0.10 | 3.40 | 0.089 | 0.74 | 42.0 | 7.0 |
| Comp. Ex. 3 | 100 | 0.10 | 8.00 | 0.210 | — | | | — | | 41.0 | 7.5 |

Referring to Table 1, in the exhaust gas purification catalytic device having a first catalytic coating layer comprising rhodium and ceria on a substrate, compared to Comparative Example 1, wherein the first catalytic coating layer is divided into a upstream portion and a downstream portion, and the ceria concentration in the downstream portion is the same as the ceria concentration in the upstream portion, Comparative Example 2, wherein the first catalytic coating layer is divided into a upstream portion and a downstream portion, and the ceria concentration in the downstream portion is less than the ceria concentration in the upstream portion, and Comparative Example 3, wherein the first catalytic coating layer is not divided into a upstream portion and a downstream portion, it is understood that both cold and hot $NO_x$ emissions are reduced in each of the exhaust gas purification catalytic devices of Examples 1 to 3, wherein the first catalytic coating layer is divided into a upstream portion and a downstream portion, and the ceria concentration in the downstream portion is greater than the ceria concentration in the upstream portion.

II. Examining Two-Layer Catalyst (1): Effect of Ceria Concentration Ratio

Example 4

Manufacturing the Exhaust Gas Purification Catalytic Device
(Preparing the Coating Liquid for Forming the First Catalytic Coating Layer Upstream Portion and the Coating Liquid for Forming the First Catalytic Coating Layer Downstream Portion)

A coating liquid for forming the first catalytic coating layer upstream portion and a coating liquid for forming the first catalytic coating layer downstream portion were prepared in the same manner as those in Example 1, respectively.
(Preparing the Coating Liquid for Forming the Second Catalytic Coating Layer)

Palladium nitrate in an amount equivalent to 0.60 g of Pd metal and 60 g of alumina particles were charged in pure water, stirred, and thereafter dried and baked to obtain 60.6 g of palladium supported alumina particles.

Separately therefrom, rhodium nitrate in an amount equivalent to 0.20 g of Rh metal and 40 g (equivalent to 8 g of ceria) of ceria-zirconia composite oxide particles (ceria content of 20% by mass) were charged in pure water, stirred, and thereafter dried and baked to obtain 40.2 g of rhodium supported ceria-zirconia composite oxide particles.

The entire amount of each of the palladium supported alumina particles and the rhodium supported ceria-zirconia composite oxide particles obtained above, 17 g (equivalent to 5 g of ceria) of ceria-zirconia composite oxide particles (ceria content of 30% by mass), and alumina sol as a binder were charged in pure water and stirred to prepare a coating liquid for forming the second catalytic coating layer. The ceria content in the obtained coating liquid for forming the second catalytic coating layer was 13.0 g in total.
(Forming the Coating Layer)

A honeycomb substrate made of cordierite, having a diameter of 108 m and a length of 76 mm (capacity of 700 mL), was coated with the coating liquid for forming the first catalytic coating layer upstream portion in a range of 38 mm (50% of the total length of the substrate) from the exhaust gas flow upstream side, dried, and thereafter baked to form the first catalytic coating layer upstream portion. The ceria concentration (mass of ceria per unit length) in the first catalytic coating layer upstream portion (length of 38 mm) was 0.060 g/mm-upstream portion.

The honeycomb substrate having formed thereon the first catalytic coating layer upstream portion was coated with the coating liquid for forming the first catalytic coating layer downstream portion in a range of 38 mm (50% of the total length of the substrate) from the exhaust gas flow downstream side, dried, and thereafter baked to form the first catalytic coating layer downstream portion. The ceria concentration (mass of ceria per unit length) in the first catalytic coating layer downstream portion (length of 38 mm) of the exhaust gas purification catalytic device was 0.150 g/mm-upstream portion.

The honeycomb substrate having formed thereon the first catalytic coating layer upstream portion and downstream portion was coated over the entire length thereof with the coating liquid for forming the second catalytic coating layer, and thereafter dried and baked to form the second catalytic coating layer and thereby manufacture the exhaust gas purification catalytic device of Example 4. The ceria concentration (mass of ceria per unit length) in the second catalytic coating layer (length of 76 mm) of the exhaust gas purification catalytic device was 0.171 g/mm-upstream portion.

In the exhaust gas purification catalytic device of Example 4, the ratio ($[CeO_2]_{Rr}/[CeO_2]_{Fr}$) of the ceria concentration in the first catalytic coating layer downstream portion ($[CeO_2]_{Rr}$) to the ceria concentration in the first catalytic coating layer upstream portion ($[CeO_2]_{Fr}$) was 2.50. The ratio ($[CeO_2]_{Up}/[CeO_2]_{Rr}$) of the ceria concentration in the second catalytic coating layer ($[CeO_2]_{Up}$) to the ceria concentration in the first catalytic coating layer downstream portion ($[CeO_2]_{Rr}$) was 1.14.
Evaluating Exhaust Gas Purification Performance Exhaust gas purification performance was evaluated in the same manner as in Example 1, using the obtained exhaust gas purification catalytic device. The cold hydrocarbon (HC) emission and the cold and hot $NO_x$ emissions are shown in Table 3.

Examples 5 and 6 and Comparative Examples 4 to 6

Each coating liquid was prepared in the same manner as in Example 4 to manufacture the exhaust gas purification catalytic device, except that when preparing the coating liquid for forming each catalytic coating layer, the ceria content of the ceria-zirconia composite oxide contained in each coating liquid was changed to the ceria content in each coating liquid as indicated in Table 2. In Comparative Example 6, the length of the first catalytic coating layer upstream portion was set to 76 mm (100% of the total length of the substrate), and the first coating layer downstream portion was not provided.

Exhaust gas purification performance was evaluated in the same manner as in Example 4, using the obtained exhaust gas purification catalytic device. The results, with the ceria concentration ratios of the first catalytic coating layer upstream portion, the first catalytic coating layer downstream portion, and the second catalytic coating layer, are shown in Table 3.

TABLE 2

| | First catalytic coating layer (lower layer) | | | | | | | | Second catalytic coating layer (upper layer) | | | |
|---|---|---|---|---|---|---|---|---|---|---|---|---|
| | Upstream portion | | | | Downstream portion | | | | | | | |
| | | | Ceria | | | | Ceria | | | | | Ceria content |
| | Length ratio (%) | Rh Weight (g) | Weight (g) | Ceria concentration (g/mm-upstream portion) | Length ratio (%) | Rh Weight (g) | Weight (g) | Ceria concentration (g/mm-downstream portion) | Pd Weight (g) | Rh Weight (g) | Weight (g) | Ceria concentration (g/mm-coating layer) |
| Ex. 4 | 50 | 0.10 | 2.30 | 0.060 | 50 | 0.10 | 5.70 | 0.150 | 0.60 | 0.20 | 13.0 | 0.171 |
| Ex. 5 | 50 | 0.10 | 2.90 | 0.076 | 50 | 0.10 | 5.10 | 0.134 | 0.60 | 0.20 | 13.0 | 0.171 |
| Ex. 6 | 50 | 0.10 | 3.40 | 0.089 | 50 | 0.10 | 4.60 | 0.121 | 0.60 | 0.20 | 13.0 | 0.171 |
| Comp. Ex. 4 | 50 | 0.10 | 4.00 | 0.105 | 50 | 0.10 | 4.00 | 0.105 | 0.60 | 0.20 | 13.0 | 0.171 |
| Comp. Ex. 5 | 50 | 0.10 | 4.60 | 0.121 | 50 | 0.10 | 3.40 | 0.089 | 0.60 | 0.20 | 13.0 | 0.171 |
| Comp. Ex. 6 | 100 | 0.10 | 8.00 | 0.210 | — | | | | 0.60 | 0.20 | 13.0 | 0.171 |

TABLE 3

| | Ceria concentration ratio | | Exhaust gas purification performance | | |
|---|---|---|---|---|---|
| | $[CeO_2]_{Rr}/[CeO_2]_{Fr}$ | $[CeO_2]_{Up}/[CeO_2]_{Rr}$ | Cold HC (mg/mile) | Cold NOx (mg/mile) | Hot NOx (mg/mile) |
| Ex. 4 | 2.50 | 1.14 | 18.3 | 12.0 | 1.7 |
| Ex. 5 | 1.76 | 1.28 | 18.0 | 12.4 | 1.7 |
| Ex. 6 | 1.36 | 1.41 | 18.5 | 13.0 | 1.8 |
| Comp. Ex. 4 | 1.00 | 1.63 | 19.0 | 14.0 | 2.2 |
| Comp. Ex. 5 | 0.75 | 1.92 | 20.0 | 15.5 | 2.2 |
| Comp. Ex. 6 | — | — | 20.3 | 15.5 | 2.4 |

Referring to Tables 2 and 3, in the exhaust gas purification catalytic device having a first catalytic coating layer comprising rhodium and ceria on a substrate, and further having a second catalytic coating layer comprising palladium, rhodium, and ceria on the first coating layer, compared to Comparative Example 4, wherein the first catalytic coating layer is divided into an upstream portion and a downstream portion, the ceria concentration in the second catalytic coating layer is greater than the ceria concentrations in the first catalytic coating layer front-end portion and downstream portion, and the ceria concentration in the first catalytic coating layer downstream portion is the same as the ceria concentration in the upstream portion, Comparative Example 2, wherein the first catalytic coating layer is divided into an upstream portion and a downstream portion, the ceria concentration in the second catalytic coating layer is greater than the ceria concentrations in the first catalytic coating layer front-end portion and the downstream portion, and the ceria concentration in the first catalytic coating layer downstream portion is less than the ceria concentration in the upstream portion, and Comparative Example 3, wherein the first catalytic coating layer is not divided into an upstream portion and a downstream portion, it is understood that cold HC emission and cold and hot $NO_x$ emissions are reduced in each of the exhaust gas purification catalytic devices of Examples 1 to 3, wherein the first catalytic coating layer is divided into an upstream portion and a downstream portion, the ceria concentration in the first catalytic coating layer downstream portion is greater than the ceria concentration in the upstream portion, and the ceria concentration in the second catalytic coating layer is greater than the ceria concentration in the first catalytic coating layer downstream portion.

III. Examining Two-Layer Catalyst (2): Examining the Length Ratio of the First Catalytic Coating Layer Upstream Portion and Downstream Portion Examples 7 and 8

Each exhaust gas purification catalytic device was manufactured in the same manner as in Example 4, except that when forming each catalytic coating layer, the length of each coating layer was set as indicated in Table 4.

Exhaust gas purification performance was evaluated in the same manner as in Example 4, using the obtained exhaust gas purification catalytic device. The results, with the ratios ($[CeO_2]_{Rr}/[CeO_2]_{Fr}$) of the ceria concentration in the first catalytic coating layer downstream portion ($[CeO_2]_{Rr}$) to the ceria concentration in the first catalytic coating layer upstream portion ($[CeO_2]_{Fr}$) and the ratios ($[CeO_2]_{Up}/[CeO_2]_{Rr}$) of the ceria concentration in the second catalytic coating layer ($[CeO_2]_{Up}$) to the ceria concentration in the first catalytic coating layer downstream portion ($[CeO_2]_{Rr}$), are shown in Table 5. Tables 4 and 5 also indicate the layer structure and evaluation results of the exhaust gas purification catalytic device manufactured in Example 4.

TABLE 4

| | First catalytic coating layer (lower layer) | | | | | | | Second catalytic coating layer (upper layer) | | | |
|---|---|---|---|---|---|---|---|---|---|---|---|
| | Upstream portion | | | | Downstream portion | | | | | | |
| | | | Ceria | | | | Ceria | | | | Ceria |
| | Length ratio (%) | Rh Weight (g) | Weight (g) | Ceria concentration (g/mm-upstream portion) | Length ratio (%) | Rh Weight (g) | Weight (g) | Ceria concentration (g/mm-downstream portion) | Pd Weight (g) | Rh Weight (g) | Weight (g) | Ceria concentration (g/mm-upper layer) |
| Ex. 4 | 50 | 0.10 | 2.30 | 0.060 | 50 | 0.10 | 5.70 | 0.150 | 0.60 | 0.20 | 13.0 | 0.171 |
| Ex. 7 | 30 | 0.10 | 1.40 | 0.060 | 70 | 0.10 | 8.00 | 0.150 | 0.60 | 0.20 | 13.0 | 0.171 |
| Ex. 8 | 70 | 0.10 | 3.20 | 0.060 | 30 | 0.10 | 3.50 | 0.150 | 0.60 | 0.20 | 13.0 | 0.171 |

TABLE 5

| | Ceria concentration ratio | | Exhaust gas purification performance | | |
|---|---|---|---|---|---|
| | $[CeO_2]_{Rr}/[CeO_2]_{Fr}$ | $[CeO_2]_{Up}/[CeO_2]_{Rr}$ | Cold HC (mg/mile) | Cold NOx (mg/mile) | Hot NOx (mg/mile) |
| Ex. 4 | 2.50 | 1.14 | 18.3 | 12 | 1.7 |
| Ex. 7 | 2.50 | 1.14 | 18.0 | 13 | 1.6 |
| Ex. 8 | 2.50 | 1.14 | 18.5 | 12 | 1.7 |

With reference to Tables 4 and 5, in the exhaust gas purification catalytic device further comprising a first catalytic coating layer comprising rhodium and ceria and a second catalytic coating layer comprising palladium, rhodium, and ceria on the first coating layer, when the first catalytic coating layer is divided into an upstream portion and a downstream portion, the ceria concentration in the first catalytic coating layer downstream portion is greater than the ceria concentration in the upstream portion, and the ceria concentration in the second catalytic coating layer is greater than that of the first catalytic coating layer downstream portion, it is understood that the cold HC emission, as well as the cold and hot $NO_x$ emissions, is reduced at the length ratio of the first catalytic coating layer upstream portion to downstream portion within a wide range of at least 30:70 to 70:30.

REFERENCE SIGNS LIST 1 first catalytic coating layer
1a first catalytic coating layer upstream portion
1b first catalytic coating layer downstream portion
2 second catalytic coating layer
3 substrate
10 exhaust gas purification catalytic device

The invention claimed is:

1. An exhaust gas purification catalytic device, comprising
a substrate, a first catalytic coating layer on the substrate, and a second catalytic coating layer on the first catalytic coating layer
wherein the first catalytic coating layer comprises a first catalytic coating layer upstream portion on an exhaust gas flow upstream side and a first catalytic coating layer downstream portion on an exhaust gas flow downstream side,
wherein the first catalytic coating layer upstream portion and the first catalytic coating layer downstream portion each comprise inorganic oxide particles and rhodium supported on the inorganic oxide particles,
wherein at least a part of the inorganic oxide particles contains ceria,
wherein the total mass (g) of ceria contained in the first catalytic coating layer upstream portion to the first catalytic coating layer downstream portion allocated per 1 L of substrate capacity is 5 g/L or more and 20 g/L or less,
wherein the ratio of ceria content per unit length of the first catalytic coating layer downstream portion to ceria content per unit length of the first catalytic coating layer upstream portion is 1.1 or greater and 3.0 or less,
wherein the first catalytic coating layer upstream portion is arranged such that an end portion on the exhaust gas flow upstream side is in direct contact with an exhaust gas flow,
wherein the second catalytic coating layer comprises inorganic oxide particles and rhodium and palladium supported on the inorganic oxide particles,
wherein at least a part of the inorganic oxide particles in the second catalytic coating layer contains ceria,
wherein the total mass (g) of ceria contained in the second catalytic coating layer allocated per 1 L of substrate capacity is 10 g/L or more and 30 g/L or less,
wherein the ratio of ceria content per unit length of the second catalytic coating layer to ceria content per unit length of the first catalytic coating layer downstream portion is 1.1 or greater and 2.0 or less.

2. The exhaust gas purification catalytic device according to claim 1, wherein the ceria of the first catalytic coating layer is contained in particles of one or more inorganic oxides selected from pure ceria and a composite oxide containing ceria.

3. The exhaust gas purification catalytic device according to claim 2, wherein the composite oxide containing ceria is a ceria-zirconia composite oxide.

4. The exhaust gas purification catalytic device according to claim 2, wherein the second catalytic coating layer comprises an alkaline-earth metal compound.

5. The exhaust gas purification catalytic device according to claim 2, wherein the ratio of mass of an alkaline-earth metal compound to the total mass of the first catalytic coating layer is 5% by mass or less.

6. The exhaust gas purification catalytic device according to claim 2, wherein the ratio of mass of an alkaline-earth metal compound to the total mass of the first catalytic coating layer is 5% by mass or less.

7. The exhaust gas purification catalytic device according to claim 1, wherein the ceria of the second catalytic coating layer is contained in particles of one or more inorganic oxides selected from pure ceria and a composite oxide containing ceria.

8. The exhaust gas purification catalytic device according to claim 7, wherein the composite oxide containing ceria is a ceria-zirconia composite oxide.

9. The exhaust gas purification catalytic device according to claim 7, wherein the rhodium in the second catalytic coating layer is supported on particles of one or more inorganic oxides selected from pure ceria and the composite oxide containing ceria, and
   wherein the palladium of the second catalytic coating layer is supported on particles of an inorganic oxide other than pure ceria and the composite oxide containing ceria.

10. The exhaust gas purification catalytic device according to claim 9, wherein the second catalytic coating layer comprises an alkaline-earth metal compound.

11. The exhaust gas purification catalytic device according to claim 9, wherein the ratio of mass of an alkaline-earth metal compound to the total mass of the first catalytic coating layer is 5% by mass or less.

12. The exhaust gas purification catalytic device according to claim 7, wherein the second catalytic coating layer comprises an alkaline-earth metal compound.

13. The exhaust gas purification catalytic device according to claim 1, wherein the second catalytic coating layer comprises an alkaline-earth metal compound.

14. The exhaust gas purification catalytic device according to claim 1, wherein the ratio of mass of an alkaline-earth metal compound of the total mass of the first catalytic coating layer is 5% by mass or less.

15. The exhaust gas purification catalytic device according to claim 1, wherein the ratio of mass of an alkaline-earth metal compound to the total mass of the first catalytic coating layer is 5% by mass or less.

16. The exhaust gas purification catalytic device according to claim 1, wherein the molar ratio of rhodium content per unit length of the first catalytic coating layer downstream portion to rhodium content per unit length of the first catalytic coating layer upstream portion is 0.8 to 1.2.

17. The exhaust gas purification catalytic device according to claim 1, wherein the length of the first catalytic coating layer upstream portion is 30% to 70% of the total length of the first catalytic coating layer.

18. An exhaust gas purification method which uses the exhaust gas purification catalyst device according to claim 1,
   wherein the exhaust gas purification catalyst device is arranged so that the first catalytic coating layer upstream portion faces to an exhaust gas flow upstream side.

* * * * *